April 5, 1927.  E. R. GURNEY  1,623,473
CUSHION SUPPORT FOR RADIATORS
Original Filed Sept. 5, 1924
Fig.1,
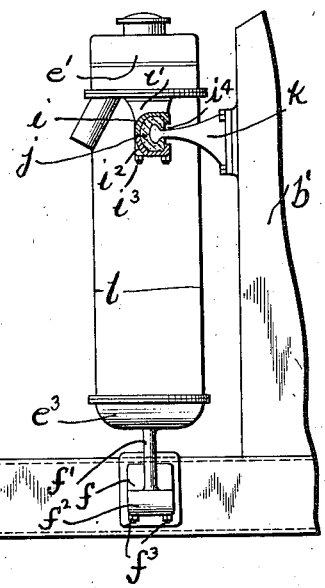
Fig.2,
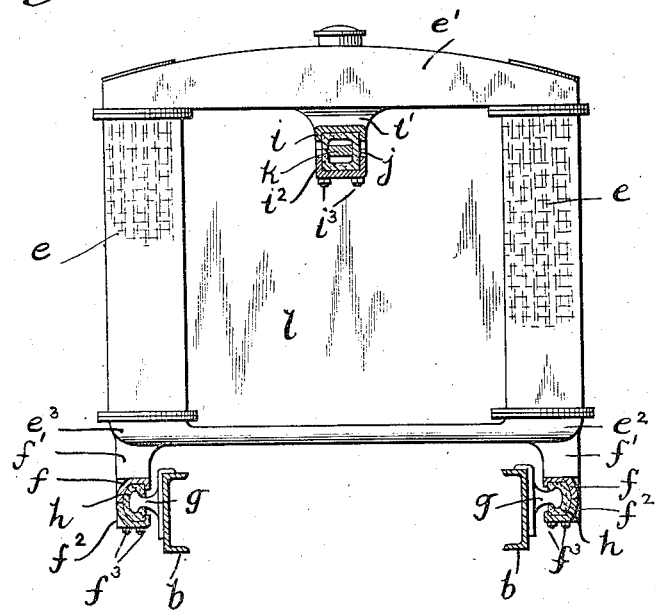
Inventor
Erving R. Gurney
By his Attorney's
Redding, Greeley, O'Shea & Campbell.

Patented Apr. 5, 1927.

1,623,473

UNITED STATES PATENT OFFICE.

ERVING R. GURNEY, OF BEECHHURST, NEW YORK, ASSIGNOR TO INTERNATIONAL MOTOR COMPANY, OF NEW YORK, N. Y., A CORPORATION OF DELAWARE.

CUSHION SUPPORT FOR RADIATORS.

Original application filed September 5, 1924, Serial No. 736,007. Divided and th's application filed May 4, 1925. Serial No. 27,707.

This application is a division of U. S. Ser. No. 736,007 filed September 5, 1924. The invention relates to radiators for motor vehicles. One object of the invention is to so mount a motor vehicle radiator as to relieve it, in whole or in part, of the strains and stresses incident to the weaving of the vehicle frame in passing over inequalities in the roadway. To this end there is provided a three-point support for the radiator from the vehicle frame. More particularly the radiator may be supported, near the lowermost portion thereof, directly from the vehicle frame by connections disposed at either side of the radiator as with the side frame members of the chassis to comprise two of the points of support. The third point of support may comprise a connection between the radiator near its upper portion and the vehicle dash which in turn is carried with the chassis. Another object of the invention is to relieve to a degree the radiator when so supported, of the shocks and vibrations set up in the chassis frame. To this end the connections comprising the radiator supports are formed of yielding nonmetallic material, such as rubber, which serves to cushion the radiator and absorb, in whole or in part, the shocks and vibrations which would otherwise be impressed with undiminished intensity upon the radiator. In practice, blocks of the yielding nonmetallic material may most conveniently be retained within housings carried with the radiator to engage the ends of arms carried with the chassis frame and vehicle dash and entering the housings. Preferably the yielding non-metallic material is retained in the housings under compression whereby its strength, resiliency and wearing qualities are increased.

The invention will now be described more particularly in connection with the accompanying drawings illustrating a preferred embodiment thereof and in which:

Figure 1 is a view in side elevation partly in section showing a fragmentary portion of the chassis frame and dash of a motor vehicle and a radiator supported according to the present invention.

Figure 2 is a view in front elevation, showing the radiator and supports therefor.

According to the present invention the banks $e$, $e$ of radiator tubes and tanks $e'$, $e^2$ $e^3$ form a rigid whole which is to be supported independently of any fan housing from the vehicle chassis by means of yielding non-metallic cushion connections adapted to cushion or absorb shocks and stresses impressed upon the vehicle frame and prevent their transmission in whole or in part to the radiator. To this end a housing $f$ is supported as by brackets $f'$ from each of the lower tanks $e^2$, $e^3$, respectively, and an arm $g$ is supported from a side frame member of the chassis and is adapted to enter the housing $f$ and be engaged by yielding non-metallic material $h$ contained within the housing. The yielding non-metallic material may conveniently comprise rubber and preferably it is maintained under internal static pressure whereby its strength, resiliency and wearing qualities are materially increased. In order to maintain the material under compression the housing is preferably formed in two parts, the lower portion $f^2$ being separate from the rest of the housing $f$ and adapted to be secured thereto by bolts $f^3$ serving to draw the two parts of the housing together to compress the yielding non-metallic material contained therein. Preferably the housing sections are so formed as to provide an opening in the side thereof facing the side frame member of the chassis and it is through this opening that the arm $g$ enters. A similar housing $i$ is carried by means of brackets $i'$ centrally of the underside of tank $e'$. A block of yielding non-metallic material $j$ is similarly contained within housing $i$ and is maintained under compression by the lower housing section $i^2$ by means of the bolts $i^3$. The arm $k$ which enters the open side $i^4$ of the housing and is engaged by the yielding non-metallic material $j$ is adapted to be carried in suitable manner by the dash $b$. It will be observed that the radiator i. e. the upper and lower tanks and the radiator tubes, is supported wholly from the chassis either directly through the connections with the side members $b$ or through the connections with the dash $b'$ which is directly supported upon the chassis.

It will thus be seen that construction has been provided which affords strength and rigidity in a radiator for motor vehicles and a direct support for the same from the chassis while at the same time the shocks and stresses which would ordinarily be received from the chassis frame are cushioned.

The invention is not to be considered limited to the particular type of radiator disclosed and various modifications may be made in the arrangement and disposition of parts as well as in the type of non-metallic connections used.

What I claim is:

In a motor vehicle, in combination with the chassis frame having a vertical dash supported thereon and a vertical radiator comprising upper and spaced lower tank sections and tubes therebetween, housings carried with the lower tank sections, respectively, a housing carried with the upper tank, said housings being formed with an opening in one side thereof, respectively, arms carried with the chassis frame and extending transversely thereof into the housings on the lower tanks through the openings therein, an arm carried rigidly with the vertical dash above the horizontal plane of the first named arms and perpendicular to the transverse vertical plane of said first named arms and extending into the housing carried with the upper tank, and blocks of yielding non-metallic material carried within the housings and engaging the ends of the arms.

This specification signed this 1st day of May A. D. 1925.

ERVING R. GURNEY.